(12) United States Patent
Simmons

(10) Patent No.: US 6,811,710 B2
(45) Date of Patent: Nov. 2, 2004

(54) LARGE WATER RESERVOIR MANAGEMENT SYSTEM

(75) Inventor: Brent Simmons, Palo Alto, CA (US)

(73) Assignee: Severn Trent Water Purification, Inc., Colmar, PA (US)

( * ) Notice: Subject to any disclaimer, the term of this patent is extended or adjusted under 35 U.S.C. 154(b) by 358 days.

(21) Appl. No.: 10/131,677

(22) Filed: Apr. 24, 2002

(65) Prior Publication Data

US 2002/0162802 A1 Nov. 7, 2002

Related U.S. Application Data

(63) Continuation-in-part of application No. 09/951,183, filed on Sep. 13, 2001.
(60) Provisional application No. 60/287,997, filed on May 1, 2001.

(51) Int. Cl.[7] .................................................. C02F 1/76
(52) U.S. Cl. ........................ 210/754; 210/756; 210/85; 210/101; 210/198.1
(58) Field of Search ................................ 210/754, 756, 210/85, 101, 198.1

(56) References Cited

U.S. PATENT DOCUMENTS

| | | | |
|---|---|---|---|
| 3,710,811 A | 1/1973 | Leverenz et al. | 137/5 |
| 3,724,474 A | 4/1973 | DeVale | 137/5 |
| 3,897,798 A | 8/1975 | DeVale | 137/6 |
| 4,094,786 A | 6/1978 | Bury | 210/101 |
| 4,306,581 A | 12/1981 | Alandt | 137/93 |
| 4,512,887 A | 4/1985 | Ritke et al. | 210/220 |
| 5,735,600 A | 4/1998 | Wyness et al. | 366/101 |
| 5,772,697 A | 6/1998 | Moore et al. | 8/543 |
| 5,979,478 A | 11/1999 | Screptock et al. | 137/3 |
| 5,997,745 A | 12/1999 | Tonelli et al. | 210/652 |
| 6,027,240 A | 2/2000 | Han | 366/101 |
| 6,077,444 A | 6/2000 | Peltzer | 210/743 |
| 6,245,224 B1 | 6/2001 | Enoki et al. | 210/87 |
| 6,270,246 B1 | 8/2001 | Han | 366/131 |

FOREIGN PATENT DOCUMENTS

| | | |
|---|---|---|
| DE | 198 44 179 A1 | 3/2000 |
| WO | WO 01/92652 A1 | 12/2001 |

*Primary Examiner*—Betsey Morrison Hoey
(74) *Attorney, Agent, or Firm*—D'Ambrosio & Associates PLLC; Jo Katherine D'Ambrosio, Esq.

(57) ABSTRACT

A method and apparatus for controlling water impurity level and temperature uniformity within large water-containing reservoirs including a pump located in the body of water, the pump ejecting a jet of water therefrom and ingesting water at a point remote from said ejecting and an eductor positioned in the jet of water for pulling in low pressure water and flowing a stream of water therefrom providing mixing and circulation of water within the reservoir to remove temperature gradients. Water purity is controlled by a controller.

18 Claims, 2 Drawing Sheets

LARGE WATER RESERVOIR MANAGEMENT SYSTEM

CROSS REFERENCE TO RELATED APPLICATIONS

This application is a continuation-in-part of U.S. Ser. No. 09/951,183, filed Sep. 13, 2001, which claims priority to U.S. Provisional Application Ser. No. 60/287,997, filed May 1, 2001.

BACKGROUND OF THE INVENTION

This invention relates to large water-containing reservoirs and more specifically, it relates to managing a large body of water in a reservoir to ensure high quality water for dispensing to municipalities and the like.

Large water reservoirs have the problem that water at or near the surface can become warmer during the summer, particularly in warm climates. Make-up water usually is colder and, while it may reduce the temperature, is not very effective and instead make-up water can short-circuit the retained water in the reservoir. This has the problem that it leads to poor mixing and temperature gradients accompanied by ineffective mixing of disinfectant chemicals added to the reservoir. Thus, the reservoir retains poor quality water. Accordingly, it will be seen that there is great need for a system which effectively disinfects and maintains uniformity in temperature.

Different systems have been proposed for treating and managing water systems. For example, U.S. Pat. No. 6,245,224 discloses a water quality management system for managing the water quality in a water supply network having water pipe lines running from the purification plant to consumers' faucets to maintain the water quality at the consumers at the terminals of the network at an appropriate level. The water quality monitors for measuring the quality of water in the pipe lines are installed in the small-pipe water distribution network branching from the water distribution main pipe network and running toward the consumers. The water distribution facility for improving the water quality is installed at the base point of the small-pipe water distribution network. The water quality in the small-pipe water distribution network is managed based on the signals from the water quality monitors.

U.S. Pat. Nos. 3,724,474 and 3,897,798 disclose that the halogen level in a water treatment system is monitored and controlled by a method which includes continuous sensing of the halogen level in a flow of the water under treatment, detecting insufficient halogen levels, adding halogen in response to detection of insufficient halogen levels, and terminating the addition of halogen upon detection of a second halogen level which is above that of the first mentioned level. Apparatus for carrying out this method includes a pair of electrodes disclosed in a stream of the fluid undergoing treatment, a charge storage device connected across the electrodes, means for pulsing electrodes and charged storage device, means for detecting the decay of stored charge as a function of the halogen level of the fluid and means for controlling the addition of halogen in accordance with desired halogen levels.

U.S. Pat. No. 4,094,786 discloses a control apparatus for water treatment systems which embodies a float switch actually responsive to a predetermined drop in stored water level causing the pumping of treatment solution to a predetermined rate of flow controlled by a flow orifice for a predetermined period of time when called for by a thus energized clock totalizer embodying cam mechanism therein and a sensitive switch responsive thereto for controlling the flow of treatment solution to the water reservoir proportional to the delivery of make up water controlled by the float switch.

U.S. Pat. No. 6,077,444 discloses a method of manufacturing a water treatment system for providing a flow of treated water having a pre-established quality, for example, a maximum TDS and permitted pH range, from a flow of reclaimed water having a quality poorer than the pre-established quality of the treated water and a flow of treatment water. The system includes a mixing reservoir; first and second fluid conduits connected to the mixing reservoir for flowing the reclaimed water and the treatment water into the reservoir; and a third fluid conduit connected to the mixing reservoir for discharging a flow of treated water from the mixing reservoir, and sensors connected for sensing the flow rates and qualities of the reclaimed water and treatment water flowed into the mixing reservoir and of the treated water discharged from the mixing reservoir. Signals, e.g., electrical signals, associated with the sensors indicate the sensed water flow rates and qualities, and controls responsive to the signals regulate the flows of reclaimed water and treatment water into the mixing reservoir through the controlled flow valves in the first and second conduits so as to cause the quality of the treated water discharged from the mixing reservoir through said third fluid conduit to be at least about as good as the pre-established treated water quality.

In spite of these disclosures, there is still a great need for an improved method and system for managing or controlling a large body of water contained in a reservoir to ensure uniformity of temperature within the reservoir and to ensure high quality of water for dispensing therefrom.

SUMMARY OF THE INVENTION

It is an object of the invention to provide an improved water reservoir system.

It is another object of the invention to provide an improved treatment system for a body of water contained in a reservoir.

Yet, it is another object of the invention to remove temperature stratification or gradients and provide for temperature uniformity in large water-containing reservoir.

Still, it is another object of the invention to provide for continuous chlorine or chlorine-related analysis of water and automatically and continuously control dosage of chemicals added to the water to maintain high quality municipal usable water.

These and other objects will become apparent from a reading of the specification and claims and an inspection of the drawings appended hereto.

In accordance with these objects, there is provided a method for controlling water impurity level and temperature uniformity within large water-containing reservoirs, the method having the ability to deliver chemically-treated water from said reservoir to the end user. The method comprises providing a reservoir having a body of water therein and locating a recirculating pump in the body of water, the pump ejecting a jet of water therefrom and ingesting water at a point remote or away from said ejecting. An eductor is placed in the jet of water, pulling in low pressure water to the eductor and flowing a stream of water therefrom, providing mixing and circulation of water within the reservoir and removing temperature gradient in the body of water. One of ammonia and a hypochlorite is added to the body of water on a continuous basis, the ammonia or hypochlorite is added to the stream of water flowing from the eductor to ensure against concentration gradients. Simultaneously with the mixing, a test stream of water is removed from the reservoir on a continuous basis. The level of at least one of chlorine and chloroamine in the test stream is determined to provide a chlorine or chloroamine measurement related signal which is relayed to a controller. In the controller, the signal is compared to a set point indicative of the level of chlorine or chloroamine desired in the water in the reservoir to provide a comparison. In response to the comparison, the amount of ammonia or hypochlorite being added to the reservoir is maintained, increased or decreased to provide the quality of water desired in the reservoir.

Additionally, there is provided a system for managing water purity level and water temperature uniformity within large water-containing reservoirs, the system having the ability to provide chemically-treated water having uniform temperature for end users. The system is comprised of a recirculating pump for locating in a body of water in a reservoir, the pump designed to produce a jet of water therefrom in the body and to ingest water from the body at a point remote from the ejecting. An eductor is positioned in the jet of water, the eductor designed to draw low pressure water surrounding the eductor and to discharge a stream of water therefrom to provide further mixing and circulation of water within the reservoir and to remove or destroy temperature gradients in the body of water while maintaining uniform disinfectant levels. Means are provided for adding at least one of ammonia and hypochlorite or other chemicals to the body of water on a continuous basis, the means designed to add one of the ammonia and hypochlorite, for example, to the stream of water discharging from the eductor. Further, means are provided for removing a test stream of water from the reservoir on a continuous basis, the means designed to remove the test stream remote from the water discharging from the eductor. An analyzer is used for determining the level of at least one of chlorine and chloroamine or other chemical in the test stream to provide a chlorine or chloroamine or chemical related signal. A controller is designed to receive the signal and to compare the signal to a set point indicative of the level of chlorine, chloroamine, or other chemical, desired in the reservoir water to provide a comparison, and in response to the comparison, the controller is designed to maintain, increase, or decrease the amount of ammonia or hypochlorite added to the body of water in the reservoir to provide high quality water for the end users.

DETAILED DESCRIPTION OF PREFERRED EMBODIMENTS

Figure 1:
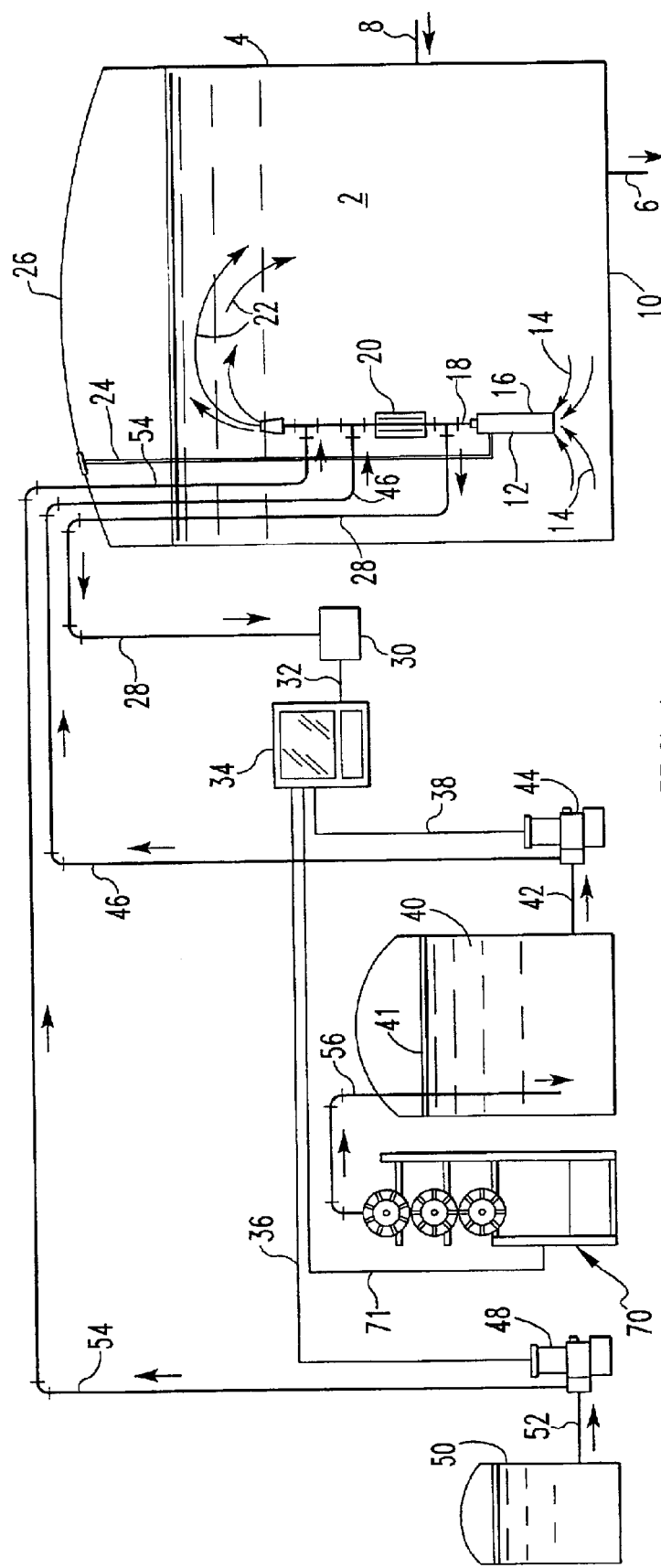
FIG. 1 is a schematic illustrating steps in accordance with the invention.

Referring now to FIG. 1, there is schematically illustrated a method and apparatus for maintaining a body of water 2 substantially free of temperature gradients and also for maintaining the body of water under high quality conditions suitable for the end users. Thus, there is illustrated body of water 2 contained in reservoir 4. Water is dispensed from reservoir 4 along line 6 and added to reservoir 4 along line 8. Preferably, water is dispensed from bottom 10 to further utilize pressure from head of water in reservoir 4. Water may be introduced at any location but is typically introduced on the side. It should be noted that large reservoirs have the problem that water in the reservoirs becomes warm, particularly in hot climates. Make-up water introduced to the reservoir usually is colder and while it may reduce the temperature of the retained water, it is not very effective and instead make-up water tends to short-circuit the retained water. This can result in the retained water becoming stagnant and generally unsuitable for use. Thus, in accordance with the invention there is provided a recirculating pump 12 submerged in body 2 of water in the reservoir. While pump 12 is preferably positioned upright or substantially vertically as shown in FIG. 1, other orientation can be used effectively to stir or mix the water contained in the reservoir. In operation, pump 12 ingests water at lower portion or bottom 16 from adjacent the reservoir bottom 10 as illustrated by water flow arrows 14 and discharges a jet 18 of water. In the embodiment illustrated in FIG. 1, an eductor or ejector 20 is provided and located or positioned to utilize jet 18 of water emanating from pump 12 to further increase mixing within body 2 of water contained in the reservoir. After the water has passed through eductor 20, it disperses in body 2, as illustrated by arrows 22.

Eductor 20 provides additional mixing by using jet 18 of water discharged from pump 12 which is at a higher pressure than water surrounding the jet. That is, the jet of water from pump 12 acts as the pumping fluid in the eductor. As the jet of water passes through a venturi in the eductor, it develops a suction which causes some of the surrounding water to be taken into the eductor and entrained with jet 18, causing further or additional mixing in the reservoir.

In the embodiment illustrated in FIG. 1, pump 12 and eductor or mixer 20 can be conveniently retrofitted to existing reservoirs. That is, pump 12 and eductor 20 maybe suspended on shut member 24 which can be easily inserted through an existing opening (not shown) in top 26.

In another aspect of the invention, the chemistry of the water in reservoir 4 is maintained by continuous sampling of the water and adjusting the amount of chemicals such as ammonia and chlorine-containing materials such as chlorine gas, chlorite, chlorine dioxide and hypochlorite added thereto. That is, in accordance with the invention, a small stream of water is removed from tank 4 on a continuous basis along line 28 to water analyzer 30 where the amount of free chlorine and total chlorine are measured. These measurements may be used to generate chlorine or chloroamine-related measurement signals which are electrically communicated along line 32 to a controller 34 such as programmable logic controller (PLC). The programmable logic controller is set up to compare the chlorine or chloroamine-related measurement signals with a set point, and the programmable logic controller then determines whether the amount of chlorine in the water should be maintained, or should be adjusted upwardly or downwardly.

In the present invention, the amount of chlorine and chloroamine in the water is preferably controlled by addition of chlorine or chlorine-containing compound such as hypochlorite and ammonia added. Typically, free chlorine and chloramines are maintained in the range of 0.01 to 10 ppm in the reservoir. From FIG. 1, it will be seen that hypochlorite such as sodium hypochlorite is added from a source or supply 40. Sodium hypochlorite solution is added along line 42 to pump 44 and is directed along line 46 to tank 4. Preferably, the sodium hypochlorite is added after eductor 20 for purposes of more efficient mixing with the water from eductor 20 and distribution throughout body 2 of water.

If the determination is made by programmable logic controller 34 that the level of chloroamines are high compared to chlorine in the water, this indicates that sodium hypochlorite is required to be added. Thus, programmable logic controller 34 sends a signal along line 38 to pump 44 to increase the amount of sodium hypochlorite solution being added to tank 4. It will be appreciated that programmable logic controller 34 can be programmed to calculate the amount of sodium hypochlorite to be introduced to the reservoir for correction purposes. Further, if sodium hypochlorite is already being added, programmable logic controller 34 can be programmed to calculate the additional amount of sodium hypochlorite to be introduced to the water in the reservoir.

If the determination is made by analyzer 30 and programmable logic controller 34 that the level of chlorine is high compared to chloroamines, this indicates that ammonia is low in water 2 and that ammonia is required to be added. Or, if the determination is made that the correct amount of ammonia is being added, the amount of sodium hypochlorite may be reduced and accordingly programmable logic controller sends the required signal to reduce the amount of sodium hypochlorite being added. If the determination is made that the amount of ammonia being added is too low, programmable logic controller 34 sends a signal along line 36 to pump 48 to increase the amount of ammonia to be added. Accordingly, ammonia is added from ammonia storage tank 50 along line 52 and then along line 54 to water 2 in water tank 4. Preferably, the ammonia is added after the water is discharged from eductor or mixer 20 to facilitate mixing in the water. As noted earlier with respect to sodium hypochlorite, programmable logic controller 34 can be programmed to calculate the additional amount of ammonia to be introduced to the reservoir for correction purposes.

If the correct amount of sodium hypochlorite is being added, and the ammonia is high, then programmable logic controller 34 can signal the adjustment to pump 48 to reduce the amount of ammonia being added in order to have the required balance of chlorine and chloroamine in the water being treated. It will be appreciated that the impurities in make-up water being added to reservoir 4 can change from time to time depending on the seasons, and the current system automatically adjusts for changes in composition of impurities in make-up or feed water.

It should be noted that ammonia and hypochlorite react in the water as follows:

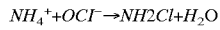

$$NH_4^+ + OCl^- \rightarrow NH_2Cl + H_2O$$

The chloroamine has a longer half life than that of chlorine and thus is preferred for the present invention.

It should be appreciated that programmable logic controller 34 continuously monitors the level of chlorine and chloroamine in the water in reservoir 4 using analyzer 30. Then, programmable logic controller 34 calculates whether or not the correct amount of ammonia and hypochlorite is being added based in the amount present in the sample water. Continuously monitoring the water by analyzer 30 provides programmable logic controller 34 with information respecting the water in tank 4 and permits determination by controller 34 whether the amount of either ammonia or hypochlorite being added is required to be increased or decreased or to remain the same.

In operation, programmable logic controller 34 makes the comparison, using stored values in memory or logic table or any suitable control algorithm, and decides whether each of ammonia or hypochlorite or both need to increased or decreased and in response thereto sends the appropriate signal to the pumps 48 and/or 44 to increase or decrease or maintain the amounts of chemicals being forwarded to water in tank 4. Implementation of the changes can be handled by any controller set up to analyze the data from the analyzer and forward the appropriate signals to pumps 44 and 48. Thus, the controller can be a PID or similar controller or programmable logic controller can be used.

While reference is made herein to sodium hypochlorite, it will be appreciated that any hypochlorite such as potassium or calcium hypochlorite can be used. The preferred hypochlorite is sodium hypochlorite. Preferably, the sodium hypochlorite is provided in a water solution containing 0.01 to 15 wt. % sodium hypochlorite, with a typical solution containing about 0.8 wt. % sodium hypochlorite. The sodium hypochlorite can be supplied in bulk and mixed to provide the desired concentration or the sodium hypochlorite can be generated on site as needed by generator 70 and supplied to tank or supply 40. That is, programmable logic controller 34 can be set to monitor the level of sodium hypochlorite in tank 40. When programmable logic controller 34 detects that level 41 has reached a predetermined level, it sends a signal along line 71 to sodium hypochlorite generator 70 to supply sodium hypochlorite solution to tank 40 along line 56 until level 41 reaches a predetermined level wherein programmable logic controller 34 sends another signal switching off generator 70.

An important part of the subject invention includes recirculating pump 12 used in combination with eductor 20. This combination has the effect of providing more efficient mixing in large reservoirs. That is, the use of eductor 20 improves mixing by moving or utilizing 3 to 5 more volumes of water in the reservoir. Thus, this has the advantage of providing for superior mixing of disinfectants or chemicals and in addition provides for more uniformity of temperature within reservoir 4 and avoidance of stagnation.

Figure 2:
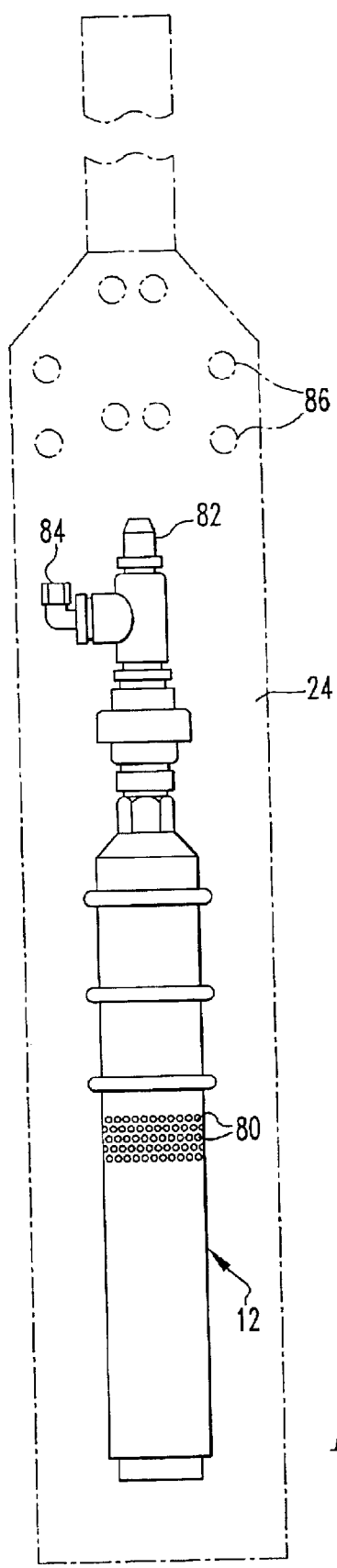
FIG. 2 is a schematic illustrating a recirculating pump in accordance with the invention.

A recirculating pump suitable for use in tank 4 is shown in FIG. 2. While eductor 20 is illustrated in FIG. 1, suitable eductors are available from Pardee Engineering, Miami, Fla. As noted, eductor 20 is positioned to receive the high pressure jet of water 18 from pump 12 which operates to pull in surrounding low pressure water, greatly increasing the amount or volume of water circulated within reservoir 4.

Further, while any method of supplying hypochlorite to tank 40 may be used, a preferred method is disclosed in U.S. patent application Ser. No. 09/948,810, filed Sep. 7, 2001, entitled "Method and System for Generating Hypochlorite" which is incorporated herein by reference as if specifically set forth. In this method for producing sodium hypochlorite, a brine solution is provided for electrolyzing in a first electrolyzer cell and chilled water is added to the brine solution to provide a chilled brine solution which is then added to the electrolyzer cell and subjected for electrolyzing to produce a first hypochlorite and brine solution which has an increase in temperature. To the hypochlorite and brine solution from the first cell is added additional chilled water to lower the temperature of first hypochlorite and brine solution which is added to a second electrolyzing cell and subjected to electrolyzing thereby increasing the amount of sodium hypochlorite in the solution. This provides a second solution of sodium hypochlorite and brine solution. To the second solution of sodium hypochlorite and brine is added chilled water which is then added to a third electrolyzer cell and electrolyzed to further provide sodium hypochlorite in the brine solution. This process is repeated one or more times until the hypochlorite and brine solution passes through all the cells in the electrolyzer assembly. The chilled water added may first be subjected to water softening to remove hardness from the water. The brine water comprises 20 wt. % to saturation with salt and the brine and chilled water solution in the first cell comprises sodium chloride in a range of 20 to 200 g/l, preferably 100 to 200 g/l. All ranges provided herein include all of the numbers and all fractions of a number within the range as if specifically set forth herein.

FIG. 2 is a schematic representation of a recirculating pump 12 mounted on strut 24 in accordance with the invention. That is, pump 12 is fastened to strut 24. Pump 12 has a perforated water intake 80 and a nozzle exit 82. Water sample line 28 (FIG. 1) may be connected to coupling 84 for purposes of continuously removing a water sample which is forwarded or directed to chemical analyzer 30 (FIG. 1). The water jet emanating from nozzle exit 82 is used to power eductor 20. Holes or apertures 86 may be used to locate chemical dosing lines 54 and 46 which can be located before or after eductor 20. For most applications, a 1 HP stainless steel submersible pump is suitable. An eductor useful with a 1 HP pump should provide about five times the flow or about 50 gpm. Further, typically the pump is mounted in a generally vertical direction approximately within about 10 feet above the bottom of the tank. Typically a flow rate of about 3 gph should be directed to the analyzer.

As noted, ammonia is supplied from ammonia storage tank 50 on demand as controlled by programmable logic controller 34. Any source of ammonia can be employed. Typically, in the present invention, a preferred ammonia containment system is designed to hold aqueous ammonia at atmospheric pressure without the necessity of a pressurized system tankage. This is accomplished by providing a double contained insulated polyethylene storage vessel and refrigeration system whereby ammonia is maintained below 60° F. regardless of external ambient temperature. Ammonia is delivered by bulk delivery to external connections, avoiding operator exposure. In the event of refrigeration failure, ammonia solution rate of vapor discharge is limited to energy penetrating the insulated container which greatly reduces any discharges or leaks. As a precautionary measure, redundant refrigeration can be provided.

The subject invention provides for consistent homogeneous water quality within the reservoir, allowing for a buffering capacity of the stored reservoir water. This buffering capacity allows for waters of deficient quality to be blended into these reservoirs without chemical treatment because the buffering capacity of the reservoir water will average the resulting mixture within the reservoir to an acceptable level.

This buffering capacity of the stored reservoir water also eliminates the need for critical pipeline flow measurements, in particular, the problem of "ebbing" flows on common inlet/outlet pipelines is solved.

Having described the presently preferred embodiments, it is to be understood that the invention may be otherwise embodied within the scope of the appended claims.

What is claimed is:

1. A method for adding disinfectants and maintaining temperature uniformity within large water-containing reservoirs, the method having the ability to deliver chemically-treated water from said reservoir to the end user, the method comprising:
    (a) providing a reservoir having a body of water therein;
    (b) locating a pump in said body of water, said pump ejecting a jet of water therefrom and ingesting water at a point remote from said ejecting;
    (c) placing an eductor in said jet of water, pulling in low pressure water to said eductor and flowing a stream of water therefrom providing mixing and circulation of water within said reservoir for removing temperature gradient in said body;
    (d) adding one of ammonia and a chlorine containing material to said body of water, said ammonia or chlorine containing material being added to water flowing from said pump or eductor;
    (e) simultaneously with said mixing, removing a test stream of water from said reservoir on a continuous basis;
    (f) determining the level of at least one of chlorine and chloroamine in said test stream to provide a chlorine or chloroamine measurement related signal;
    (g) relaying said signal to a controller;
    (h) in said controller, comparing said signal to a set point indicative of the level of chlorine or chloroamine desired in said water in said reservoir to provide a comparison; and
    (i) in response to said comparison, maintaining, increasing or decreasing the amount of ammonia or chlorine containing material being added to said reservoir.

2. The method in accordance with claim 1 wherein said chlorine containing material is sodium hypochlorite.

3. The method in accordance with claim 1 wherein said eductor improves mixing in said body of water by increasing water volumes pumped by 3 to 5 times.

4. The method in accordance with claim 1 wherein said pump is located near the bottom of said reservoir and in a generally vertical direction to pump water upwardly.

5. The method in accordance with claim 1 wherein free chlorine is maintained in said reservoir in the range of 0.01 to 10 ppm.

6. The method in accordance with claim 1 wherein chloroamine is maintained in said reservoir in the range of 0.01 to 10 ppm.

7. The method in accordance with claim 1 wherein sodium hypochlorite is added to said body of water in a solution containing 0.01 to 15 wt. % sodium hypochlorite.

8. The method in accordance with claim 1 wherein said test stream is pumped from said body by said pump.

9. A method of circulating water within a large water-containing reservoir for purposes of providing mixing action within the reservoir to diminish temperature gradients within water contained in the reservoir and to efficiently mix chemicals added thereto for treatment purposes, wherein in a body of water provided in a reservoir, the method comprised of:
    (a) locating a pump in said body, said pump discharging a jet of water therefrom and ingesting water at a point remote from said discharging;
    (b) placing an eductor in said jet of water to pull in low pressure water adjacent said eductor;
    (c) flowing a stream of water from said eductor for increasing flow within said body of water; and
    (d) dispersing disinfectant chemicals in one of said jet or said stream for mixing in said body of water.

10. The method in accordance with claim 9 including adding disinfectant chemical including at least one of the group consisting of ammonia, hypochlorite, and chlorine to said body to provide chlorine and chloroamine therein.

11. A system for adding disinfectants and for maintaining temperature uniformity within large water-containing reservoirs, the system having the ability to dispense chemically-treated water to end users, the system comprised of:
    (a) a recirculating pump for locating in a body of water in a reservoir, said pump designed to produce a jet of water therefrom in said body and to ingest water from said body at a point remote from said jet;

(b) an eductor positioned in said jet of water, said eductor designed to draw low pressure water surrounding said eductor and to discharge a stream of water therefrom to provide further mixing and circulation of water within said reservoir and to remove temperature gradients in said body of water;

(c) means for adding at least one of ammonia, hypochlorite, and chlorine to said body of water, said means designed to add one of said ammonia, hypochlorite, and chlorine to said stream of water discharging from said pump or said eductor;

(d) means for removing a test stream of water from said reservoir on a continuous basis, said means designed to remove said test stream remote from said water discharging from eductor;

(e) an analyzer for determining the level of at least one of chlorine and chloroamine in said test stream to provide a chlorine or chloroamine related signal; and (f) a controller designed to receive said signal and to compare said signal to a set point indicative of the level of chlorine or chloroamine desired in said reservoir water to provide a comparison, and in response to said comparison, said controller designed to maintain, increase, or decrease the amount of ammonia, hypochlorite, or chlorine added to said body of water in said reservoir.

12. The system in accordance with claim 11 wherein said hypochlorite is sodium hypochlorite.

13. The system in accordance with claim 11 wherein said pump is designed to pump said test stream from said reservoir, and said stream is returned to said reservoir after determining the level of chlorine or chloroamine.

14. The system in accordance with claim 11 wherein said eductor improves mixing by increasing water volume pumped by 3 to 5 times.

15. The system in accordance with claim 11 wherein said pump is designed for locating in substantially vertical direction to pump said jet of water upwardly.

16. A system for adding disinfectants to a body of water to control water purity and for controlling water temperature uniformity within large water-containing reservoirs, the system having the ability to dispense chemically-treated water, the system comprised of:

(a) a pump for locating generally vertically in a body of water in a reservoir, said pump designed to pump a jet of water upwardly therefrom in said body and to ingest water from said body at a point remote from said jet;

(b) an eductor for positioning in said jet of water, said eductor designed to draw low pressure water surrounding said eductor and to discharge a stream of water therefrom to provide further mixing and circulation of water within said reservoir and to remove temperature gradients in said body of water;

(c) means for adding at least one of ammonia, hypochlorite, or chlorine to said body of water, said means designed to add one of said ammonia, hypochlorite, and chlorine to said water discharging from said pump or said eductor, said pump designed to pump a test stream of water from said reservoir on a continuous basis;

(d) an analyzer for receiving said test stream of water for determining the level of at least one of chlorine and chloroamine in said test stream to provide a chlorine or chloroamine related signal; and (e) a controller designed to receive said signal and to compare said signal to a set point indicative of the level of chlorine or chloroamine desired in said reservoir water to provide a comparison, and in response to said comparison, said controller designed to maintain, increase, or decrease the amount of ammonia, hypochlorite, or chlorine-containing material added to said body of water in said reservoir.

17. A system designed for circulating water in a body of water contained in a reservoir for purposes of providing mixing action within the reservoir to diminish temperature gradients within water contained in the reservoir, the system comprised of:

(a) a pump located in said body, said pump designed for discharging a jet of water of water therefrom and for ingesting water at a point remote from said discharging;

(b) an eductor position in said jet of water to pull in low pressure water adjacent said eductor and to flow a stream of water therefrom for increasing flow within said body of water; and (c) means for dispersing disinfectant chemicals in said jet or said stream for mixing in said body of water.

18. The system in accordance with claim 17 wherein said pump includes means for pumping a test stream of water from said body to a water analyzer for returning said test stream to said reservoir.

* * * * *